UNITED STATES PATENT OFFICE.

HENRI TERRISSE, OF GENEVA, SWITZERLAND, ASSIGNOR TO THE INDESTRUCTIBLE PAINT COMPANY, LIMITED, OF LONDON, ENGLAND.

MANUFACTURE OF VARNISHES, PAINTS, AND OTHER PROTECTIVE OR COATING PREPARATIONS.

1,214,611.     Specification of Letters Patent.     Patented Feb. 6, 1917.

No Drawing.     Application filed April 22, 1915. Serial No. 23,163.

*To all whom it may concern:*

Be it known that I, HENRI TERRISSE, of 5 Florissant, Geneva, Switzerland, have invented certain new and useful Improvements in or Relating to the Manufacture of Varnishes, Paints, and other Protective or Coating Preparations, of which the following is a specification.

This invention relates to the manufacture of varnishes, lacquers, insulating waterproofing coating preparations, protective preparations, paints, enamels and the like, hereinafter referred to as coating preparations, from fossil resins, and is characterized by the employment of special fossil resin products hereinafter referred to in the manufacture or preparation thereof.

It is well known that the free acid contained in fossil resins is not removed when the latter are converted into "varnish" in the conventional manner, and that this free acid is a serious objection in the manufacture of paints, enamels, coating and protective preparations and the like, and of varnishes which are intended to be mixed with pigments. On the other hand, it is not possible to form neutral varnishes by neutralizing the free acids in these fossil resins by alkalis or other bases.

Now I have found that when solubilized fossil resins such as may be prepared in accordance with the said Henri Terrisse's previous British patent specifications Nos. 14554 of 1903 and 23039 of 1908 are heated with glycerin or other high boiling alcohols to about the boiling point thereof, the acids of the fossil resins are converted into stable neutral compounds which are probably esters of the resin acids and are hereinafter referred to as esterified fossil resin acids. I have further found that the said neutral bodies, unlike the fossil resins themselves, are freely soluble in linseed oil, tung oil, turpentine or white spirit (*i. e.* volatile liquids distilled from petroleum) or a mixture of these or in other oils and spirits commonly used in varnish making all of which are hereinafter referred to as solvent media. In carrying out my present invention, therefore, I dissolve these fossil resin products in linseed oil, tung oil, turpentine or white spirit, or a mixture of these or in other suitable oils, spirits or solvents; a varnish or medium can thus be produced which being neutral is free from the objection of the acid-resin varnishes. If desired other resins may be added. Paints and enamels made with the esterified resin-varnish do not "liver" or thicken and metallic pigments are not prejudicially affected.

The fossil resin products for the purposes of the present invention may be produced in accordance with my specification Serial Number 23,164 filed April 22, 1915.

Example 1: Melt 100 kilos of Manila resin which has been esterified as above mentioned, and raise the temperature of the melt to 300° C., then add 50 kilos of linseed oil, maintaining the temperature at 300° C. When all the oil has been incorporated the temperature is raised to 310° C. and is kept at this point until the desired consistency of the varnish is obtained. Add driers in the usual way and dilute the varnish with white spirit, turpentine, or other suitable spirit. This varnish is an excellent product for undercoating body varnish.

Example 2: 75 kilos of the varnish from Example 1 are ground in a ball mill with 75 kilos or oxid of zinc. This paint has a good covering power and can be very easily spread. It does not thicken if it is kept in a closed vessel, that is to say if evaporation of the diluent is avoided.

Example 3: 100 kilos of Kongo copal esterified with glycerin are introduced into a gum-pot and melted. 350 kilos of linseed oil are added little by little at 310° C. and this temperature is then maintained until the desired consistency of the varnish is obtained. Then add driers and dilute with turpentine or other suitable spirit. This varnish is a very good varnish for outside use. It is quite neutral, very durable and can also serve for making enamel paints.

The varnishes represented by these examples would not stand the addition of oxid of zinc without thickening if the resins had not been esterified with glycerin or high boiling alcohols.

What I claim and desire to secure by Letters Patent is:—

1. Process for the manufacture of a coating preparation, comprising heating glycerin ester of fossil resin acid with a siccative oil, adding driers and diluting with a volatile diluent.

2. Process for the manufacture of a coating preparation, comprising heating glycerin ester of fossil resin acid with a siccative oil, adding driers and a volatile diluent, and grinding with a pigment.

3. Process for the manufacture of a coating preparation, comprising heating glycerin ester of fossil resin acid with a siccative oil, adding driers and a volatile diluent, and grinding with oxid of zinc.

4. A coating preparation comprising esterified fossil resin in solution in a solvent medium.

5. A coating preparation comprising ester of a high boiling alcohol with fossil resin acid, in solution in a solvent medium.

6. A coating preparation comprising glycerin ester of fossil resin acid in a solution in a solvent medium.

7. A coating preparation comprising glycerin ester of fossil resin acid in solution in a siccative oil.

8. A coating preparation, comprising glycerin ester of fossil resin acid in solution in a siccative oil, a volatile diluent and a pigment.

9. A coating preparation, comprising glycerin ester of fossil resin acid in solution in a siccative oil, a volatile diluent, and zinc oxid.

In testimony whereof I have signed my name to this specification in the presence of two subscribing witnesses.

HENRI TERRISSE.

Witnesses:
ROBERT MILTON SPEARPOINT,
ORLANDO J. WORTH.